United States Patent
Chen et al.

(10) Patent No.: US 11,606,039 B2
(45) Date of Patent: Mar. 14, 2023

(54) SYNCHRONOUS RECTIFIER CIRCUIT, CONTROL CIRCUIT AND CONTROL METHOD THEREOF

(71) Applicant: Silergy Semiconductor Technology (Hangzhou) LTD, Hangzhou (CN)

(72) Inventors: Chaojun Chen, Hangzhou (CN); Jian Deng, Hangzhou (CN); Jin Jin, Hangzhou (CN)

(73) Assignee: Silergy Semiconductor Technology (Hangzhou) LTD, Hangzhou (CN)

( * ) Notice: Subject to any disclaimer, the term of this patent is extended or adjusted under 35 U.S.C. 154(b) by 263 days.

(21) Appl. No.: 17/145,526

(22) Filed: Jan. 11, 2021

(65) Prior Publication Data

US 2021/0226548 A1    Jul. 22, 2021

(30) Foreign Application Priority Data

Jan. 16, 2020    (CN) .......................... 202010045483.2

(51) Int. Cl.
*H02M 3/335* (2006.01)
*H02M 1/08* (2006.01)

(52) U.S. Cl.
CPC ......... *H02M 3/33592* (2013.01); *H02M 1/08* (2013.01)

(58) Field of Classification Search
CPC ....... H02M 3/33592; H02M 1/08; H02M 3/01
See application file for complete search history.

(56) References Cited

U.S. PATENT DOCUMENTS

| | | | |
|---|---|---|---|
| 6,005,780 A | 12/1999 | Hua | |
| 6,580,258 B2 | 6/2003 | Wilcox et al. | |
| 9,325,254 B2 | 4/2016 | Deng et al. | |
| 9,331,588 B2 | 5/2016 | Chen | |
| 9,488,680 B2 | 11/2016 | Xu | |
| 9,716,430 B1* | 7/2017 | Trescases | H03K 17/284 |
| 2004/0135201 A1* | 7/2004 | Elbanhawy | H01L 29/7813 |
| | | | 257/E29.256 |
| 2014/0078789 A1 | 3/2014 | Li et al. | |
| 2014/0239934 A1 | 8/2014 | Zhang | |
| 2015/0160270 A1 | 6/2015 | Shi et al. | |
| 2015/0280578 A1 | 10/2015 | Huang et al. | |
| 2021/0376712 A1* | 12/2021 | Chen | H02M 3/335 |

FOREIGN PATENT DOCUMENTS

| | | |
|---|---|---|
| CN | 102231605 A | 11/2011 |
| CN | 106130378 A | 11/2016 |
| CN | 107968569 A | 4/2018 |

* cited by examiner

*Primary Examiner* — Kyle J Moody (57) ABSTRACT

A method of controlling a synchronous rectifier circuit can include: adjusting a falling amplitude of a drive voltage of a synchronous rectifier switch in the synchronous rectifier circuit in a pull-down mode; adjusting a shielding time during which the synchronous rectifier switch is in a turn-off shielding mode and is not to be turned off; turning off the synchronous rectifier switch after a drain-source voltage of the synchronous rectifier switch reaches a turn-off threshold; and where the falling amplitude of the drive voltage in the pull-down mode and the shielding time for a current period are adjusted according to an operation state of the synchronous rectifier switch in a previous period.

20 Claims, 6 Drawing Sheets

SYNCHRONOUS RECTIFIER CIRCUIT, CONTROL CIRCUIT AND CONTROL METHOD THEREOF

RELATED APPLICATIONS

This application claims the benefit of Chinese Patent Application No. 202010045483.2, filed on Jan. 16, 2020, which is incorporated herein by reference in its entirety.

FIELD OF THE INVENTION

The present invention generally relates to the field of power electronics, and more particularly to control circuits and methods, and associated synchronous rectifier circuits.

BACKGROUND

A switched-mode power supply (SMPS), or a "switching" power supply, can include a power stage circuit and a control circuit. When there is an input voltage, the control circuit can consider internal parameters and external load changes, and may regulate the on/off times of the switch system in the power stage circuit. Switching power supplies have a wide variety of applications in modern electronics. For example, switching power supplies can be used to drive light-emitting diode (LED) loads.

DETAILED DESCRIPTION

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

In order to improve the efficiency of a power converter, synchronous rectifier switches can be used instead of diodes to form a synchronous rectifier circuit. Due to the lead inductance of the synchronous rectifier switch, the synchronous rectifier switch can be turned off in advance, thus reducing the efficiency of synchronous rectification. Therefore, a higher turn-off threshold can be set to control the turn-off of the synchronous rectifier switch when the drain-source voltage of the synchronous rectifier switch exceeds the turn-off threshold. However, this approach may only design a fixed high turn-off threshold, and the turn-off threshold can be designed to be too high, which may lead to negative current turn-off and adversely affect the system.

In one embodiment, a method of controlling a synchronous rectifier circuit can include: (i) adjusting a falling amplitude of a drive voltage of a synchronous rectifier switch in the synchronous rectifier circuit in a pull-down mode; (ii) adjusting a shielding time during which the synchronous rectifier switch is in a turn-off shielding mode and is not to be turned off; (iii) turning off the synchronous rectifier switch after a drain-source voltage of the synchronous rectifier switch reaches a turn-off threshold; and (iv) where the falling amplitude of the drive voltage in the pull-down mode and the shielding time for a current period are adjusted according to an operation state of the synchronous rectifier switch in a previous period.

In one embodiment, a control circuit for a synchronous rectifier circuit can include: (i) a sampling circuit configured to obtain a drain-source voltage of a synchronous rectifier switch in the synchronous rectifier circuit; and (ii) a drive control circuit configured to adjust a drive voltage of the synchronous rectifier switch according to the drain-source voltage, and to adjust a shielding time during which the synchronous rectifier switch is controlled not to be turned off in a turn-off shielding mode.

Figure 1:
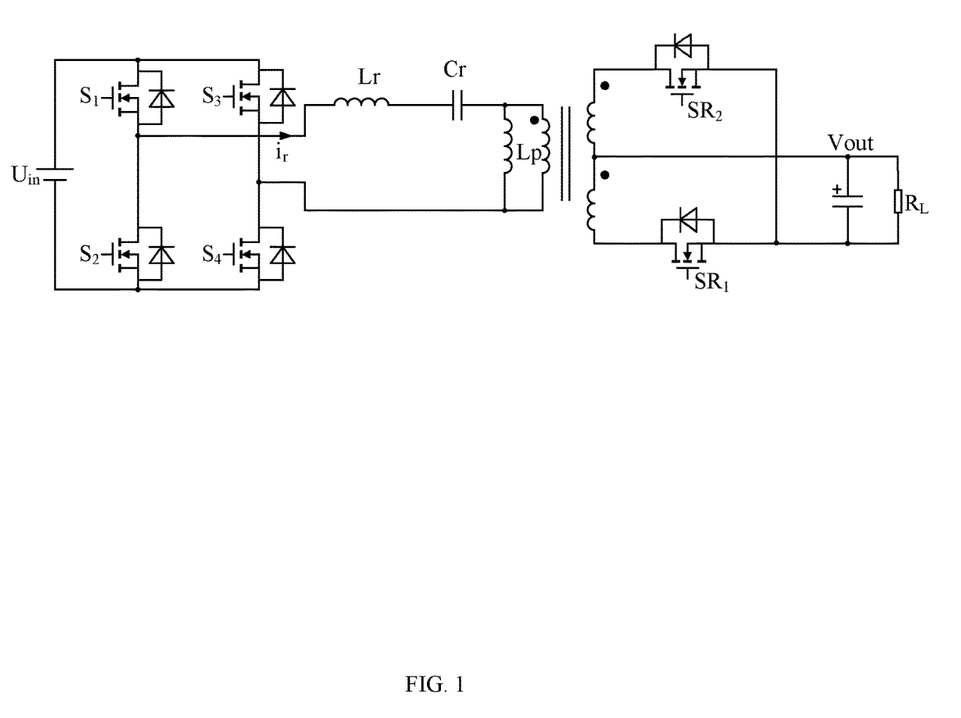
FIG. 1 is a schematic block diagram of an example synchronous rectifier circuit, in accordance with embodiments of the present invention.

Referring now to FIG. 1, shown is a schematic block diagram of an example synchronous rectifier circuit, in accordance with embodiments of the present invention. Here, a full-bridge LLC resonant converter is taken as an example, which includes a switching circuit, an LLC resonant network, a transformer, and a synchronous rectifier circuit. The switching circuit can include two bridge arms forming a full-bridge topology. One bridge arm can include a pair of power switches $S_1$ and $S_2$ coupled in series, and the other bridge arm can include a pair of power switches $S_3$ and $S_4$ coupled in series. Moreover, resonant inductance Lr, resonant capacitor Cr, and a primary winding of the transformer forming the LLC resonant network can be coupled in series between first and second nodes. For example, the first node is configured as a common terminal of power switches $S_1$ and $S_2$, and the second node is configured as a common terminal of power switches $S_3$ and $S_4$.

The secondary winding of the transformer can be a center-tapped structure. For example, the transformer includes two secondary windings. One terminal (e.g., the dotted terminal) of the first secondary winding can connect to one terminal with different properties of the second secondary winding (e.g., the non-dotted terminal) as an output port, in order to generate output voltage Vout. The synchronous rectifier circuit here is a full-wave synchronous rectifier circuit, which includes two synchronous rectifier switches. One terminal of synchronous rectifier switch $SR_1$ can connect to the non-dotted terminal of the first secondary winding, one terminal of synchronous rectifier switch $SR_2$ can connect to the dotted terminal of the second secondary winding, and the other terminals of synchronous rectifier switches $SR_1$ and $SR_2$ may be grounded. In this example, synchronous rectifier switches $SR_1$ and $SR_2$ are MOSFETs and have body diodes, but each synchronous rectifier switch can additionally be provided with an anti-parallel diode. In addition, other types of resonant converters with synchronous rectification can be applied in certain embodiments, and the secondary winding of the transformer can be other structures. Further, the rectifier circuit can be any suitable rectifier circuitry (e.g., full-bridge rectifier circuit, half-wave rectifier circuit, voltage double rectifier circuit, etc.).

Figure 2:
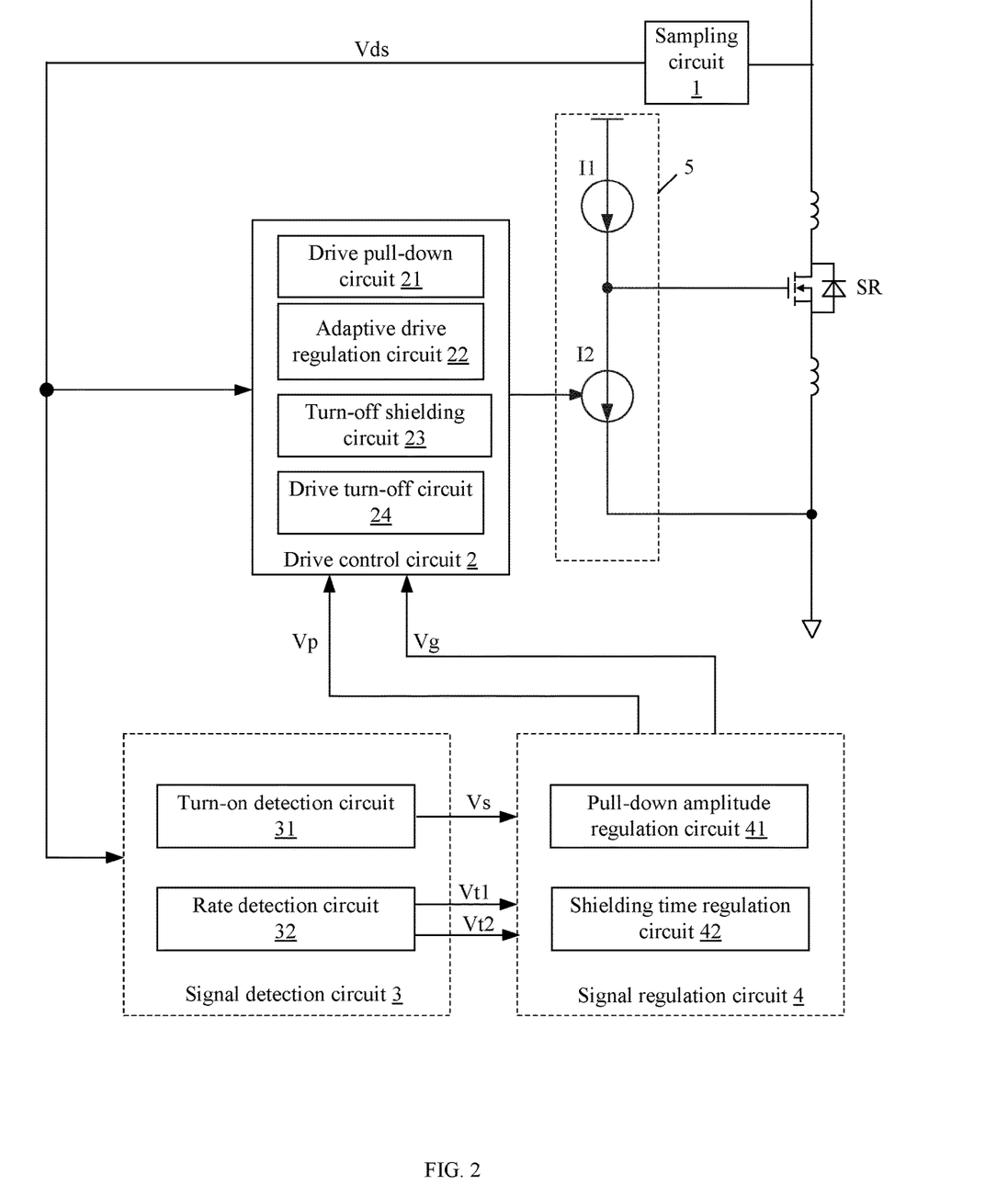
FIG. 2 is a schematic block diagram of an example control circuit of the synchronous rectifier circuit, in accordance with embodiments of the present invention.

Referring now to FIG. 2, shown is a schematic block diagram of an example control circuit of the synchronous rectifier circuit, in accordance with embodiments of the present invention. In this particular example, the control circuit can include sampling circuit 1, drive control circuit 2, signal detection circuit 3, and signal regulation circuit 4. Sampling circuit 1 can obtain drain-source voltage Vds at two power terminals of synchronous rectifier switch SR in real time. It should be understood that any suitable circuit that can sample the drain-source voltage of the synchronous rectifier switch in certain embodiments. In the current switching period, drive control circuit 2 can adjust the operation states of synchronous rectifier switch SR according to the detected drain-source voltage Vds, pull-down control signal Vg, and shielding control signal Vp.

Signal detection circuit 3 can detect a conduction state of the body diode of synchronous rectifier switch SR and a change rate of a current flowing through synchronous rectifier switch SR after synchronous rectifier SR is turned off, in order to generate an indication signal to adjust the drive voltage for driving synchronous rectifier switch SR in the next period. Further, signal regulation circuit 4 can adjust pull-down control signal Vg and shielding control signal Vp for the next switching period according to the indication signal generated by signal detection circuit 3 and the operation state of synchronous rectifier switch SR in the current switching period, and may transmit them to drive control circuit 2 to adjust the operation state of synchronous rectifier switch SR in the next switching period.

The control circuit can also include drive voltage regulation circuit 5, which can include controlled current source I1 for generating a charging current, and controlled current source I2 for generating a discharging current. Controlled current source I1 or controlled current source I2 can be controlled by a corresponding signal generated by drive control circuit 2, in order to adjust the charging and discharging current provided by drive voltage regulation circuit 5, thereby realizing regulation of drive voltage Vgs.

Drive control circuit 2 can include drive pull-down circuit 21, adaptive drive regulation circuit 22, turn-off shielding circuit 23, and drive turn-off circuit 24. Here, drive pull-down circuit 21 can control synchronous rectifier switch SR to enter a pull-down mode from a first time when drain-source voltage Vds of synchronous rectifier switch SR rises to threshold V1. When synchronous rectifier switch SR is in the pull-down mode, drive pull-down circuit 21 can control the falling amplitude of drive voltage Vgs of synchronous rectifier switch SR according to pull-down control signal Vg. For example, pull-down control signal Vg can characterize pull-down time Th during which drive voltage Vgs decreases in the pull-down mode. That is, drive voltage Vgs can be controlled to decrease from the first time, and to stop decreasing after pull-down time Th elapses. In another example, pull-down control signal Vg can characterize pull-down threshold Vh, and drive voltage Vgs may decrease to pull-down threshold Vh in the pull-down mode. That is, drive voltage Vgs can be controlled to decrease from the first time, and to stop decreasing when it decreases to pull-down threshold Vh characterized by pull-down control signal Vg. In the following examples, the pull-down control signal is used for characterizing the pull-down time, but using the pull-down control signal for characterizing the pull-down threshold can also be applied herein.

Thereafter, adaptive drive regulation circuit 22 can begin to operate, such that synchronous rectifier switch SR enters a closed-loop control mode, and drain-source voltage Vds can be controlled to be maintained at threshold V1 by adjusting drive voltage Vgs. Further, turn-off shielding circuit 23 can control synchronous rectifier switch SR to enter a turn-off shielding mode when drain-source voltage Vds of synchronous rectifier switch SR reaches threshold V2 (e.g., threshold V2 is zero). According to shielding control signal Vp for characterizing shielding time Tp, drive turn-off circuit 24 may not turn off synchronous rectifier switch SR by controlling controlled current source I2 for discharging during shielding time Tp. That is, synchronous rectifier switch SR may remain on even if drain-source voltage Vds of synchronous rectifier switch SR reaches threshold V2 during shielding time Tp.

Drive turn-off circuit 24 can control drive voltage Vgs to drop to zero when drain-source voltage Vds reaches turn-off threshold Vth_off, in order to control synchronous rectifier switch SR to be turned off. Further, signal detection circuit 3 can include turn-on detection circuit 31 and rate detection circuit 32. For example, turn-on detection circuit 31 can detect whether the body diode of synchronous rectifier switch SR is turned on after synchronous rectifier switch SR is turned off, and generate status signal Vs which is transmitted to signal regulation circuit 4. When drain-source voltage Vds of synchronous rectifier switch SR exceeds turn-on threshold Von, it can be determined that the body diode is in the conduction state. Other detection methods, such as detecting the current flowing through synchronous rectifier switch SR, can also be adopted in certain embodiments.

When status signal Vs is active, this can indicate that the body diode is in the conduction state, and synchronous rectifier switch SR may be turned off in advance. At this time, signal regulation circuit 4 can adjust pull-down control signal Vg, such that drive voltage Vgs at the end of the pull-down mode in the next period is smaller than drive voltage Vgs at the end of the pull-down mode in the current period, and may adjust shielding control signal Vp to extend shielding time Tp in the next period. For example, pull-down time Th(n) for the current period can be increased by one step ΔTh to be used as pull-down time Th(n+1) for the next period. In addition, shielding time Tp(n) for the current period can be increased by one step ΔTp to be used as shielding time Tp(n+1) for the next period. In some examples, the initial values of pull-down time Th and shielding time Tp are set to zero.

When status signal Vs is inactive, this can indicate that the body diode is not in the conduction state. Thereafter, the pull-down time and shielding time for the next period can be adjusted according to indication signal Vt. When the change rate of the current flowing through synchronous rectifier switch SR is clearly reduced, pull-down time Th(n) for the current period may be decreased by one step ΔTh to be used as pull-down time Th(n+1) for the next period, and shielding time Tp(n) for the current period can be decreased by one step ΔTp to be used as shielding time Tp(n+1) for the next period. When the change rate of the current flowing through synchronous rectifier switch SR does not decrease, pull-down time Th(n+1) and shielding time Tp(n+1) for the next period may be maintained equal to pull-down time Th(n) and shielding time Tp(n) for the current period.

For example, rate detection circuit 32 can detect the change rate of the current flowing through synchronous rectifier switch SR, and may determine whether the change rate of the current flowing through synchronous rectifier switch SR in the current period is smaller than that in the previous period when the body diode is not in the conduction state after turning off synchronous rectifier switch SR. When it is detected that the change rate of the current flowing through synchronous rectifier switch SR is clearly reduced, an active indication signal can be generated and transmitted to signal regulation circuit 4 to correspondingly adjust pull-down control signal Vg and shielding control signal Vp for the next period.

For example, rate detection circuit 32 can include a timing circuit, a comparison circuit, and a shielding detection circuit. Here, the timing circuit can detect timing time T during which drain-source voltage Vds of synchronous rectifier switch SR rises from threshold V1 to threshold V2. The comparison circuit can compare the timing time for the current period against the timing time for the previous period when the body diode of synchronous rectifier switch SR is not in the conduction state after turning off synchronous rectifier switch SR, and may generate indication signal Vt1 to be transmitted to signal regulation circuit 4. When the difference between the timing time for the current period and the timing time for the previous period is greater than a preset time, indication signal Vt1 may be active, and otherwise indication signal Vt1 may be inactive. Further, the shielding detection circuit can detect whether drain-source voltage Vds of synchronous rectifier switch SR exceeds turn-off threshold Vth_off within shielding time Tp, and may generate indication signal Vt2 to be transmitted to signal regulation circuit 4. When drain-source voltage Vds of synchronous rectifier switch SR does not exceed turn-off threshold Vth_off within shielding time Tp, indication signal Vt2 can be active, and otherwise indication signal Vt2 may be inactive.

Signal regulation circuit 4 can include pull-down amplitude regulation circuit 41 and shielding time regulation circuit 42. When pull-down amplitude regulation circuit 41 receives an inactive indication signal Vt1, the pull-down time for the next period can be maintained equal to the pull-down time for the current period. After receiving an active indication signal Vt1, pull-down amplitude regulation circuit 41 may gradually reduce the amplitude of drive voltage Vgs decreased in the pull-down mode in each subsequent period until the amplitude of the drive voltage Vgs decreased in the pull-down mode is zero or the body diode is detected to be turned on again after turning off synchronous rectifier switch SR in a certain period. For example, when indication signal Vt1 is active, pull-down time Th(n) for the current period can be decreased by one step ΔTh to be used as pull-down time Th(n+1) for the next period. In addition, in each subsequent period, the change rate of the current flowing through synchronous rectifier switch SR may not be re-compared, but the pull-down time for the current period can be decreased by one step to be used as the pull-down time for the next period, until the pull-down time is decreased to zero or the body diode of synchronous rectifier switch SR is detected to be turned on again after turning off synchronous rectifier switch SR in a certain period.

When shielding time regulation circuit 42 receives an inactive indication signal Vt2, the shielding time for the next period can be maintained equal to the shielding time for the current period. After receiving an active indication signal Vt2, shielding time Tp(n) for the current period may be decreased by one step ΔTp to be used as shielding time Tp(n+1) for the next period. In addition, in each subsequent period, the change rate of the current flowing through synchronous rectifier switch SR may not be re-compared, but the shielding time of the current period can be decreased by one step to be used as the shielding time of the next period until the shielding time is decreased to zero or the body diode of synchronous rectifier switch SR is detected to be turned on again after turning off synchronous rectifier switch SR in a certain period.

Figure 3:
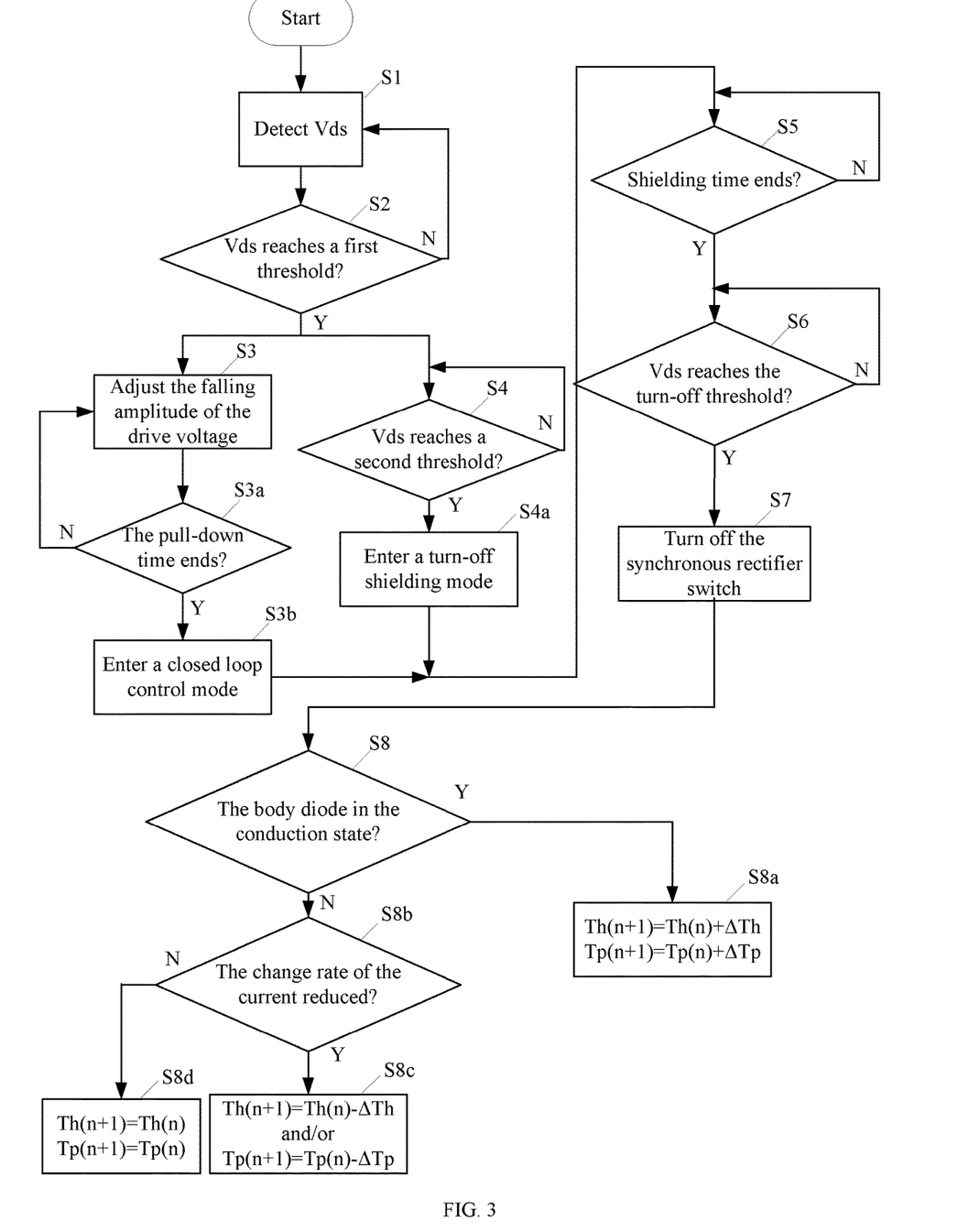
FIG. 3 is a flow diagram of an example control method of the synchronous rectifier circuit, in accordance with embodiments of the present invention.

Referring now to FIG. 3, shown is a flow diagram of an example control method of the synchronous rectifier circuit, in accordance with embodiments of the present invention. For example, at S1, the drain-source voltage of the synchronous rectifier switch can be detected in real time. At S2, whether drain-source voltage Vds reaches a first threshold may be detected. If so, S3 and S4 can be executed, and if not, the flow can return to S1. At S3, the synchronous rectifier switch can be controlled to enter a pull-down mode, and the falling amplitude of the drive voltage of the synchronous rectifier switch may be adjusted during the pull-down time. In this example, the pull-down time can be adjusted. For example, the pull-down time for the current period may be determined according to the pull-down time for the previous period. In other examples, the pull-down threshold can be adjusted. At S3a, whether the pull-down time ends can be detected. If so, S3b can be executed, and if not, the flow can return to S3. At S3b, the synchronous rectifier switch can be controlled to enter a closed-loop control mode, and then turn to S5. At S4, whether drain-source voltage Vds reaches a second threshold may be detected. If so, S4a can be executed, and if not, S4 may be executed.

At S4a, the synchronous rectifier switch can be controlled to enter a turn-off shielding mode to control the synchronous rectifier switch not to be turned off during the shielding time. In S5, whether the shielding time ends can be detected. If so, S6 is executed, and if not, S5 may be executed. At S6, whether drain-source voltage Vds reaches the turn-off threshold can be detected. If so, S7 may be executed, and if not, S6 may be executed. At S7, the synchronous rectifier switch can be controlled to be turned off. At S8, whether the body diode of the synchronous rectifier switch is in the conduction state may be detected. If so, S8a can be executed, and if not, S8b may be executed.

At S8a, the pull-down control signal and shielding control signal can be adjusted, such that pull-down time Th(n) for the current period is increased by one step to be used as pull-down time Th(n+1) for the next period; that is, Th(n+1)=Th(n)+ΔTh. In addition, shielding time Tp(n) for the current period can be increased by one step to be used as shielding time Tp(n+1) for the next period; that is, Tp(n+1)=Tp(n)+ΔTp. At S8b, whether the change rate of current flowing through the synchronous rectifier switch is reduced can be detected. If so, S8c may be executed, and if not, S8d can be executed. In certain embodiments, when the difference between the timing time for the current period and the timing time for the previous period is greater than the preset time Δt_ref, this can indicate that the change rate of current is clearly reduced. Alternatively, when the drain-source voltage of the synchronous rectifier switch in the current period does not exceed the turn-off threshold within the shielding time, this can indicate that the change rate of the current is decreased.

At S8c, the pull-down control signal and shielding control signal may be adjusted, such that pull-down time Th(n) for the current period is reduced by one step to be used as pull-down time Th(n+1) for the next period; that is, Th(n+1)=Th(n)−ΔTh. In addition, shielding time Tp(n) for the current period can be reduced by one step to be used as shielding time Tp(n+1) for the next period; that is, Tp(n+1)=Tp(n)−ΔTp. At S8d, the pull-down control signal and shielding control signal may be adjusted, such that pull-down time Th(n+1) for the next period is equal to pull-down time Th(n) for the current period; that is, Th(n+1)=Th(n), and shielding time Tp(n+1) for the next period may be equal to shielding time Tp(n) for the current period.

The above steps may be repeated in the subsequent period, but in the subsequent period, S8 can be activated to detect whether the body diode of the synchronous rectifier switch is in the conduction state. If so, S8a can be executed, and if not, S8c may be executed. That is, after detecting the decrease of the change rate of the current flowing through the synchronous rectifier switch in a certain period, the change rate of the current flowing through the synchronous rectifier switch may no longer be detected in the following periods. But, the pull-down time and/or shielding time can be directly and gradually reduced until the pull-down time and/or shielding time can be reduced to zero or the body diode of the synchronous rectifier switch is in the conduction state again after turning off the synchronous rectifier switch. Then, forward adjustment may again be started to set the best turn-off point of the synchronous rectifier switch. The judgment conditions for decreasing pull-down time and shielding time are different, and as such they are independently adjusted in certain embodiments.

Figure 4:
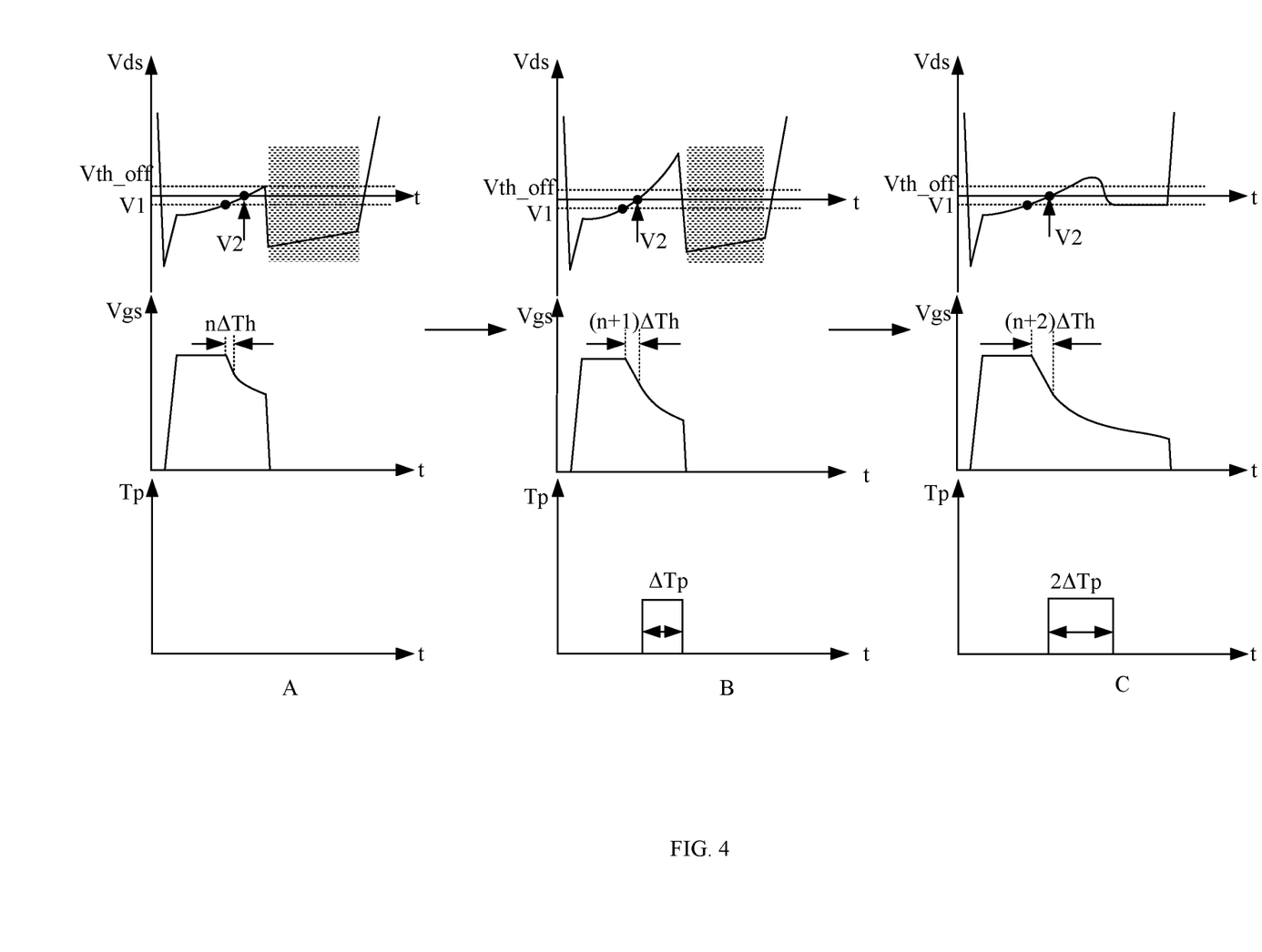
FIG. 4 is a waveform diagram of a first example operation of the control circuit of the synchronous rectifier circuit, in accordance with embodiments of the present invention.

Referring now to FIG. 4, shown is a waveform diagram of a first example operation of the control circuit of the synchronous rectifier circuit, in accordance with embodiments of the present invention. This example shows forward adaptive regulation for the pull-down time and the shielding time. During period A, when drain-source voltage Vds reaches threshold V1, synchronous rectifier switch SR enters the pull-down mode. Thus, drive voltage Vgs begins to decrease, and pull-down time Th(n) is nΔTh (e.g., the set initial value, which can also be zero). When drain-source voltage Vds reaches threshold V2 (e.g., which is zero here, or a value close to zero), synchronous rectifier switch SR may enter the turn-off shielding mode, and can be controlled not to be turned off during the shielding time.

During period A, shielding time Tp(n)=0. Due to insufficient pre-pull-down, and shielding time Tp(n) being zero, drain-source voltage Vds rises rapidly. When drain-source voltage Vds exceeds turn-off threshold Vth_off, synchronous rectifier switch SR can be turned off. Then, the body diode of synchronous rectifier switch SR is detected to be in the conduction state by detecting drain-source voltage Vds, so pull-down time Th(n+1) for next period B is adjusted to (n+1)ΔTh, and shielding time Tp(n+1) is adjusted to ΔTp. During period B, drain-source voltage Vds exceeds turn-off threshold Vth_off within shielding time ΔTp, but synchronous rectifier switch SR may not be turned off due to the shielding effect. When shielding time ΔTp ends, synchronous rectifier switch SR can be turned off since drain-source voltage Vds is still greater than turn-off threshold Vth_off, and then it can be detected that the body diode of synchronous rectifier switch SR is still in the conduction state.

Therefore, in the next period C, pull-down time Th(n+2) may be adjusted to (n+2) ΔTh, and shielding time Tp(n+2) is adjusted to 2ΔTp. It can be seen from period C that after shielding time 2ΔTp ends, drain-source voltage Vds has already fallen below turn-off threshold Vth_off, and then drain-source voltage Vds can be maintained near threshold V1 in the closed-loop control mode, and the body diode is not detected to be in the conduction state after synchronous rectifier switch SR is turned off. This shows that the current pull-down time Th(n+2) and shielding time Tp(n+2) can ensure that synchronous rectifier switch SR is turned off correctly. If there is no other change, pull-down time Th(n+3) and shielding time Tp(n+3) for another next cycle can be controlled to remain unchanged.

Figure 5:
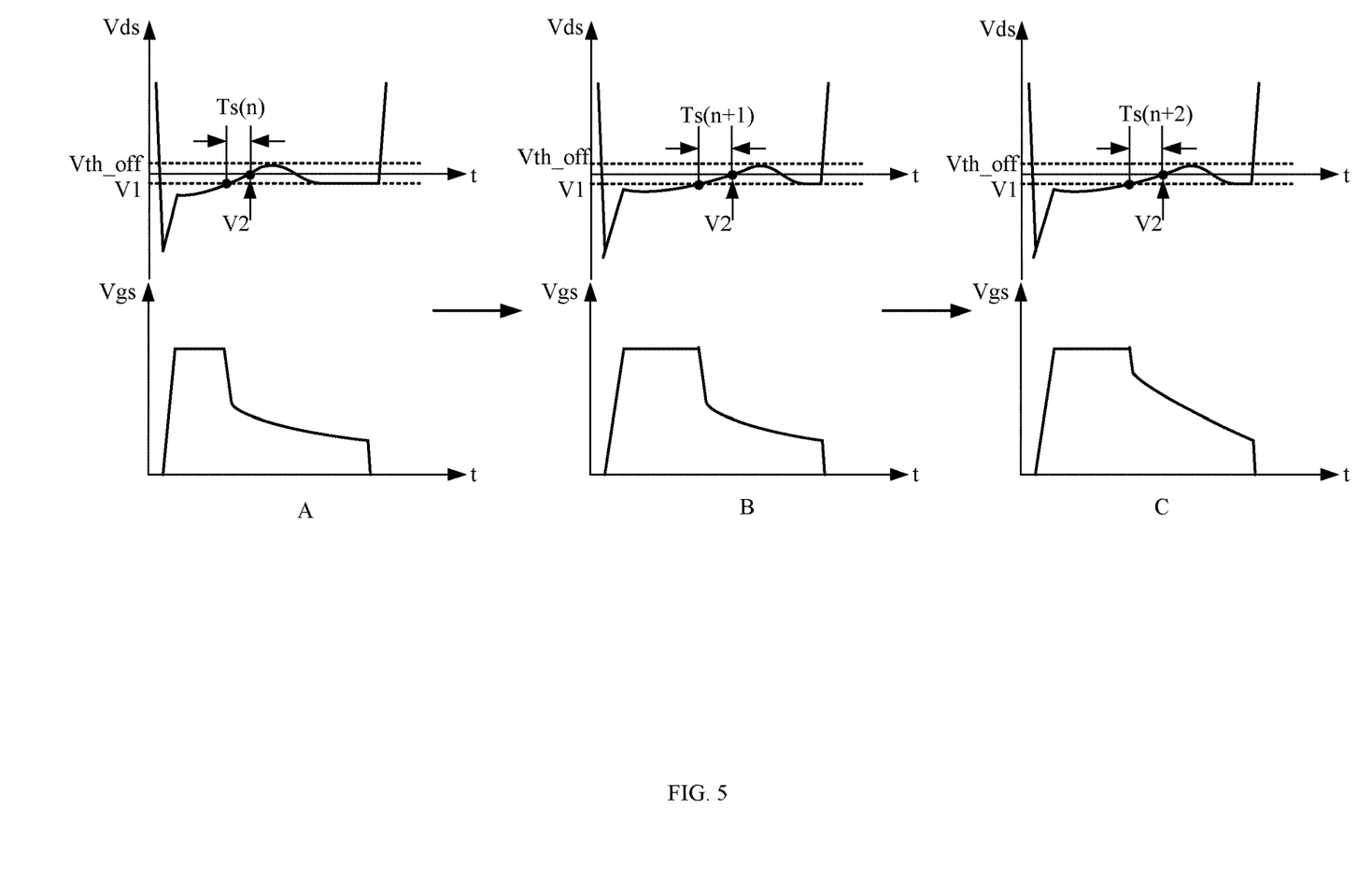
FIG. 5 is a waveform diagram of a second example operation of the control circuit of the synchronous rectifier circuit, in accordance with embodiments of the present invention.

Referring now to FIG. 5, shown is a waveform diagram of a second example operation of the control circuit of the synchronous rectifier circuit, in accordance with embodiments of the present invention. This example shows an operational waveform of reverse adaptive regulation of the pull-down time to set the best turn-off point for synchronous rectifier switch SR. In the current period A, when drain-source voltage Vds reaches threshold V1, synchronous rectifier switch SR can enter the pull-down mode. At this time, drive voltage Vgs starts to be pulled down, and the timing circuit can begin to time to obtain timing time Ts(n) during which drain-source voltage Vds rises from threshold V1 to threshold V2 (e.g., zero here).

In period A, after synchronous rectifier switch SR is turned off, the body diode can be detected not to be in the conduction state, then timing time Ts(n) for the current period may be compared against timing time Ts(n−1) for the previous period to judge whether the difference between timing time Ts(n) and Ts(n−1) is greater than preset time Δt_ref. In this example, since the difference between timing time Ts(n) and Ts(n−1) is not greater than preset time Δt_ref, pull-down time Th(n+1) for the next period B is maintained to be Th(n). During period B, timing time Ts(n+1) during which drain-source voltage Vds rises from threshold V1 to zero is also obtained, and can be compared against timing time Ts(n) for the previous period A. In this period, the difference between the two timing time Ts(n+1) and Ts(n) is larger than preset time Δt_ref, which can indicate the current flowing through synchronous rectifier switch SR is clearly reduced, so pull-down time Th(n+2) for another next cycle C may be adjusted to Th(n+1)−ΔTh.

In addition, in next period, when the body diode of synchronous rectifier switch SR is detected not to be in the conduction state after synchronous rectifier switch SR is turned off, the change rate of the current flowing through synchronous rectifier switch SR may not be re-compared, but the pull-down time for the current period can be decreased by one step to be used as the pull-down time for the next period. Repeatedly, pull-down time Th can be decreased every period until pull-down time Th is adjusted to be zero, or pull-down time Th stops decreasing when the body diode of synchronous rectifier switch SR is detected to be in the conduction state after synchronous rectifier switch SR is turned off. Then, the forward regulation for pull-down time Th can be started again to set the best turn-off point for synchronous rectifier switch SR.

Figure 6:
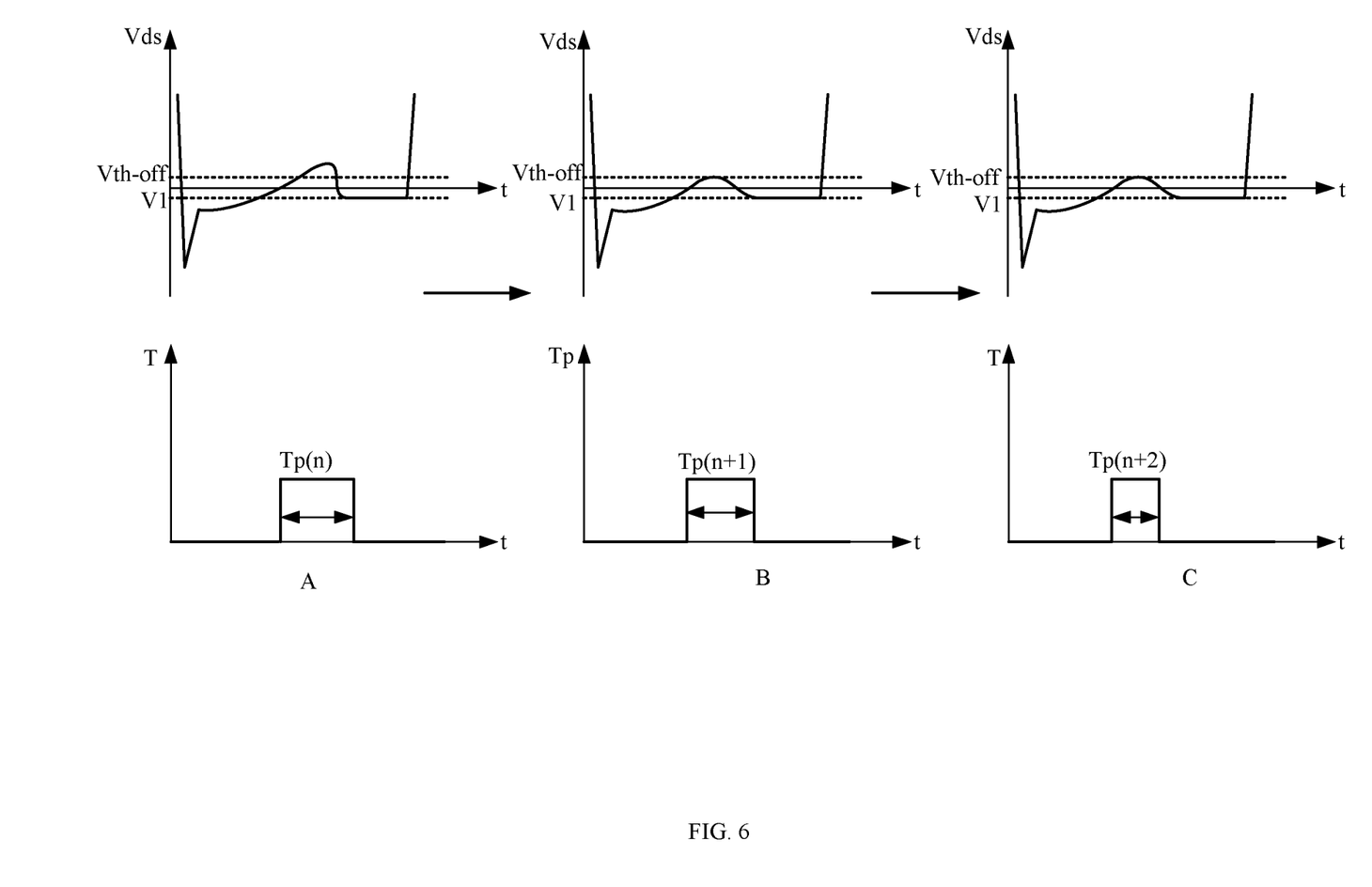
FIG. 6 is a waveform diagram of a third example operation of the control circuit of the synchronous rectifier circuit, in accordance with embodiments of the present invention.

Referring now to FIG. 6, shown is a waveform diagram of a third example operation of the control circuit of the synchronous rectifier circuit, in accordance with embodiments of the present invention. This example shows an operational waveform of reverse adaptive regulation of the shielding time. In the current period A, although synchronous rectifier switch SR is turned off correctly (e.g., the body diode is not in the conduction state after synchronous rectifier switch SR is turned off), drain-source voltage Vds exceeds turn-off threshold Vth_off during current shielding time Tp(n), and thus shielding time Tp(n+1) for the next period B remains unchanged; that is, Tp(n+1)=Tp(n).

In period B, when it is detected that drain-source voltage Vds does not exceed turn-off threshold Vth_off within shielding time Tp(n+1), it can be judged that change rate di/dt of the current has decreased, and the body diode is not in the conduction state after synchronous rectifier switch SR is turned off. So, shielding time Tp(n+2) for the next period C can be adjusted to be reduced by one step as compared with shielding time Tp(n+1) for period B. During the next period C, when it is detected that drain-source voltage Vds does not exceed turn-off threshold Vth_off within shielding time Tp(n+2), and the body diode is not in the conduction state after synchronous rectifier switch SR is turned off, shielding time Tp(n+3) for a next period can be adjusted to be Tp(n+2)−ΔTp. This can be repeated until the shielding time is reduced to zero, or the body diode is detected in the conduction state again after the synchronous rectifier switch is turned off. Then, forward regulation for shielding time Tp can be started again to set the best turn-off point for synchronous rectifier switch SR.

In particular embodiments, by dynamically adjusting the drive voltage and the shielding time of a synchronous rectifier switch, the synchronous rectifier switch can be turned off at a suitable turn-off point with a faster turn-off speed, and negative current turn-off can be substantially avoided. In this way, the efficiency of synchronous rectification can be improved, and with wider applicability and higher reliability.

The embodiments were chosen and described in order to best explain the principles of the invention and its practical applications, to thereby enable others skilled in the art to best utilize the invention and various embodiments with modifications as are suited to particular use(s) contemplated. It is intended that the scope of the invention be defined by the claims appended hereto and their equivalents.

What is claimed is:

1. A method of controlling a synchronous rectifier circuit, the method comprising:
   a) adjusting a falling amplitude of a drive voltage of a synchronous rectifier switch in the synchronous rectifier circuit in a pull-down mode;
   b) adjusting a shielding time during which the synchronous rectifier switch is in a turn-off shielding mode and is not to be turned off;
   c) turning off the synchronous rectifier switch after a drain-source voltage of the synchronous rectifier switch reaches a turn-off threshold; and
   d) wherein the falling amplitude of the drive voltage in the pull-down mode and the shielding time for a current period are adjusted according to an operation state of the synchronous rectifier switch in a previous period.

2. The method of claim 1, wherein the adjusting the falling amplitude of the drive voltage comprises:
   a) adjusting a pull-down threshold; and
   b) controlling the drive voltage to be decreased to the pull-down threshold in the pull-down mode.

3. The method of claim 1, wherein the adjusting the falling amplitude of the drive voltage comprises adjusting a pull-down time for the pull-down mode, and the drive voltage is decreased during the pull-down time.

4. The method of claim 1, further comprising:
   a) detecting whether a body diode of the synchronous rectifier switch is in a conduction state after the synchronous rectifier switch is turned off to generate a status signal; and
   b) detecting a change rate of a current flowing through the synchronous rectifier switch.

5. The method of claim 4, further comprising:
   a) adjusting the falling amplitude of the drive voltage in the pull-down mode for a next period according to the status signal, the change rate of the current, and the falling amplitude of the drive voltage in the pull-down mode for a current period; and
   b) adjusting the shielding time for a next period according to the status signal, the change rate of the current, and the shielding time for the current period.

6. The method of claim 4, further comprising increasing the falling amplitude of the drive voltage in the pull-down mode for a next period and increasing the shielding time for a next period, when the body diode is detected to be in the conduction state after the synchronous rectifier switch is turned off.

7. The method of claim 4, further comprising:
   a) comparing the change rate of the current for a current period against the change rate of the current for the previous period to generate a comparison result, when the body diode is detected not to be in the conduction state after the synchronous rectifier switch is turned off; and
   b) adjusting the falling amplitude of the drive voltage in the pull-down mode and the shielding time for the next period according to the comparison result.

8. The method of claim 7, further comprising:
   a) comparing a timing time during which the drain-source voltage of the synchronous rectifier switch rises from a first threshold to a second threshold in the current period against that in the previous period to generate the comparison result; and
   b) adjusting the falling amplitude of the drive voltage in the pull-down mode according to the comparison result.

9. The method of claim 8, wherein when a difference between the timing time for the current period and the timing time for the previous period is greater than a preset time, the falling amplitude of the drive voltage in the pull-down mode is gradually decreased in each subsequent cycle until the falling amplitude of the drive voltage in the pull-down mode is decreased to zero or the body diode of the synchronous rectifier switch is detected to be in the conduction state again after the synchronous rectifier switch is turned off.

10. The method of claim 7, further comprising:
    a) detecting whether the drain-source voltage of the synchronous rectifier switch reaches the turn-off threshold within the shielding time for the current period to generate a detection result; and
    b) adjusting the shielding time for the next period according to the detection result.

11. The method of claim 10, wherein when the drain-source voltage of the synchronous rectifier switch does not exceed the turn-off threshold within the shielding time, the shielding time is gradually decreased in each subsequent cycle until the shielding time is decreased to zero or the body diode of the synchronous rectifier switch is detected to be in the conduction state again after the synchronous rectifier switch is turned off.

12. The method of claim 1, wherein when the drain-source voltage of the synchronous rectifier switch reaches a first threshold, the synchronous rectifier switch enters the pull-down mode; and when the drain-source voltage of the synchronous rectifier switch reaches a second threshold, the synchronous rectifier switch enters the turn-off shielding mode.

13. A control circuit for a synchronous rectifier circuit, the control circuit comprising:
   a) a sampling circuit configured to obtain a drain-source voltage of a synchronous rectifier switch in the synchronous rectifier circuit; and
   b) a drive control circuit configured to adjust a drive voltage of the synchronous rectifier switch according to the drain-source voltage, and to adjust a shielding time during which the synchronous rectifier switch is controlled not to be turned off in a turn-off shielding mode.

14. The control circuit of claim 13, wherein the drive control circuit comprises:
   a) a drive pull-down circuit configured to adjust a falling amplitude of the drive voltage of the synchronous rectifier switch in a pull-down mode; and
   b) a turn-off shielding circuit configured to adjust the shielding time and to disable a turn-off signal.

15. The control circuit of claim 14, wherein the falling amplitude of the drive voltage in the pull-down mode and the shielding time for a current period are adjusted according to an operation state of the synchronous rectifier switch in a previous period.

16. The control circuit of claim 14, wherein the drive pull-down circuit is configured to adjust a pull-down threshold and control the drive voltage to be decreased to the pull-down threshold in the pull-down mode.

17. The control circuit of claim 14, wherein the drive pull-down circuit is configured to adjust a pull-down time for the pull-down mode, and the drive voltage is decreased during the pull-down time.

18. The control circuit of claim 14, wherein the drive control circuit further comprises an adaptive drive regulation circuit, configured to control the drive voltage of the synchronous rectifier switch to be maintained at a first threshold after the pull-down mode ends.

19. The control circuit of claim 13, wherein the drive control circuit further comprises a drive turn-off circuit, configured to generate a turn-off signal when the drain-source voltage reaches a turn-off threshold, in order to turn off the synchronous rectifier switch.

20. The control circuit of claim 14, further comprising a signal detection circuit configured to detect whether a body diode of the synchronous rectifier switch is in a conduction state after the synchronous rectifier switch is turned off, and to detect a change rate of a current flowing through the synchronous rectifier switch, thereby adjusting the falling amplitude of the drive voltage in the pull-down mode and the shielding time for the next period.

* * * * *